Aug. 11, 1931.  L. B. MYERS  1,818,571
DEAD END CLAMP
Filed Feb. 11, 1930
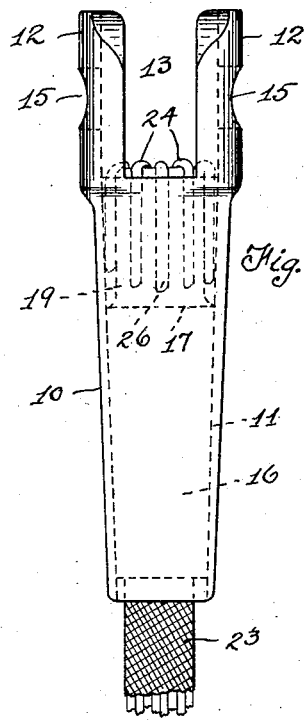
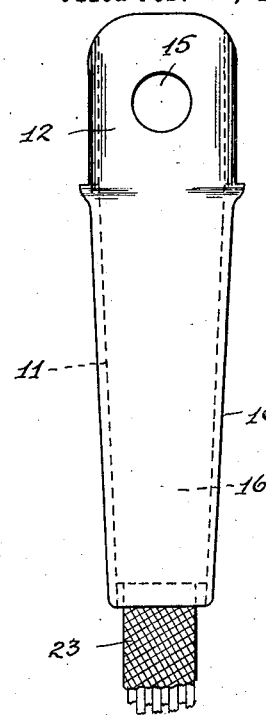
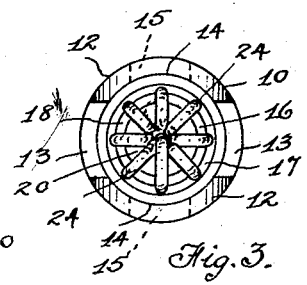
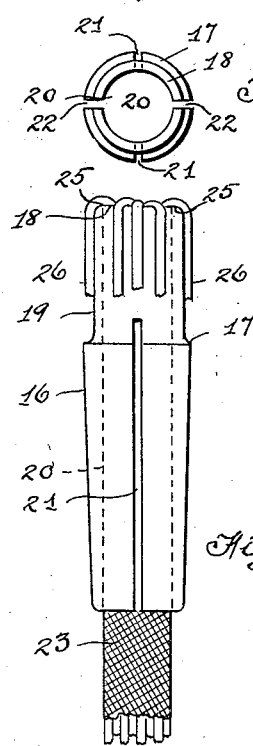
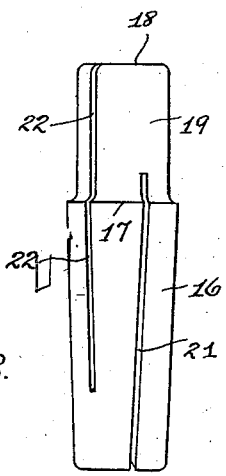
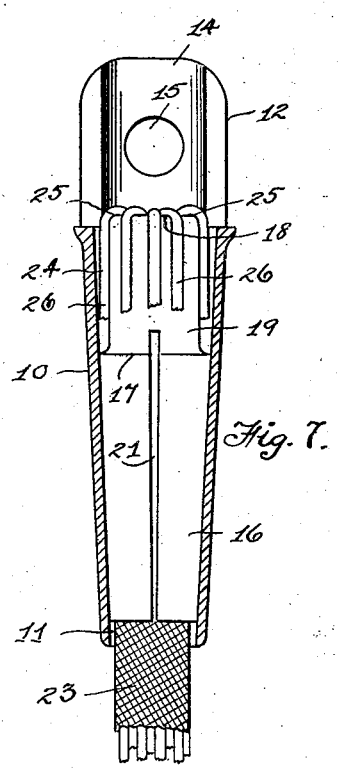
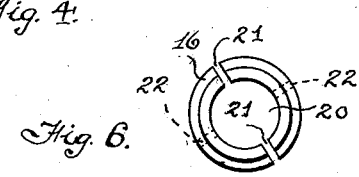
INVENTOR
Luther B. Myers
BY
Charles B. Mann Jr.
ATTORNEY Patented Aug. 11, 1931

1,818,571

UNITED STATES PATENT OFFICE

LUTHER B. MYERS, OF WARREN, OHIO

DEAD END CLAMP

Application filed February 11, 1930. Serial No. 427,460.

This invention relates to an end coupling for wires or cables such as is known in the trade as a dead end clamp, which is commonly employed to secure such end to a stationary support.

The object of the invention is to provide an improved construction of coupling that may readily be attached to the end of the wire or cable and locked thereto by tension in a lengthwise direction and which may readily be disconnected without the loss or waste of such wire or cable.

Another object is to provide an improved dead-end clamp comprising an outer sleeve and an inner core which latter may be slipped over the end of the cable and locked thereto by driving the sleeve over the core.

With these and other objects in view, the invention is illustrated in the accompanying drawings, wherein,—

Fig. 1 shows the complete coupling in elevation as viewed from one side thereof.

Fig. 2 illustrates the same as viewed from a side at a right angle with respect to that of Fig. 1.

Fig. 3 shows the device in top view.

Fig. 4 illustrates the detached yieldable core of the clamp with the wire or cable-end attached thereto.

Fig. 5 shows the outer end of the detached core,—the wire or cable being omitted.

Fig. 6 illustrates the inner end of the core,—the wire also being omitted in this view.

Fig. 7 shows a central longitudinal section through the sleeve with the core therein and the end of the wire or cable attached thereto, and Fig. 8 illustrates the detached yielding core in side elevation.

Referring to the drawings the numeral 10, designates a tubular sleeve having a tapered longitudinal passage 11 extending therethrough and provided at its outer end with an enlarged head consisting of two spaced jaws 12, separated by a central slot 13. The central slot 13 imparts a semi-circular shape to the jaws in cross-section,—the inner side 14 of each jaw being curved in continuation of the central opening through the sleeve.

Each jaw 12 is provided with a crosswise-extending hole or perforation 15, and these two holes are in alinement so that a bolt or other fastening may be passed crosswise therethrough to effect a connection with a stationary object.

In addition to the outer sleeve 10, I provide an interior core 16 which has a body that is circular in cross-section but tapered longitudinally on the exterior from the inner toward the outer end thereof, which taper terminates at an annular shoulder 17 that is spaced from the said outer end.

The annular shoulder 17, therefore constitutes the greatest diameter of the core and is located between the two ends of the latter.

From the annular shoulder 17 to the extreme outer end 18 of the core the latter is reduced in diameter and forms a neck 19, for a purpose that will presently be explained.

The core has a central interior longitudinal passage 20 which extends from end to end and said core also has a plurality of longitudinal slots 21 extending from the inner smaller end toward the outer end thereof.

In the present disclosure, the longitudinal openings 21, are formed by producing lengthwise slots through the body of the core all the way from the inner passage 20 to the outer side of the core.

The core also has a plurality of longitudinal slots 22 extending therethrough from the inner longitudinal passage 20 to the outer side thereof, and these passages 22 extend from the outer end 18 of the core through the neck 19 and annular exterior shoulder 17 toward the inner end of the core, but terminate at a point spaced from the said inner end.

In the present disclosure there are two slots 21 at diametrically opposite sides of the core and two slots 22 also at diametrically-opposite sides, but in planes at right angles to the slots 21.

The purpose of these longitudinal slots 21 and 22 is to produce a flexibility at the ends of the core that will enable said ends to be sprung inwardly when clamped on the exterior, as will presently be more fully explained.

In effecting attachment of the coupling to a wire or cable-end 23, the outer sleeve 10, is first slipped over the end of the wire or cable, and said wire or cable-end is then inserted through the central passage 20 of the core, and if the wire or cable is insulated, the insulation is stripped from the ends so that the several strands 24 of the wire may be separated.

These separated wire strand-ends 24 are then bent back and laid around the reduced neck 19 of the core between the outer end and the annular exterior shoulder 17, as shown in Figs. 4 and 7.

After all the strand-ends have been bent back against the core-neck, the sleeve 10, is then drawn outward over the core,—the latter entering the tapered longitudinal passage 11 of the sleeve, and obviously, as the sleeve is forced or driven outwardly over the core, the latter will be wedged in the tapered passage 11 and the inner and outer flexible or yielding ends of the core will be clamped about the wire or cable passing therethrough and securely lock the parts together.

During the operation of driving the sleeve outwardly over the core, the latter will be firmly seated in the bends 25 of the back-turned wire strands, while the free-ends 26, of those strands will be held down around the reduced neck because of the encircling wall of the sleeve-passage 11, and thus the sleeve and core will be locked together while the core and cable will be securely engaged.

Whenever it is desired to disconnect the clamp, the sleeve may be driven inwardly from over the core and the core and wire strands thus exposed. The wire strands will then be turned up from around the neck of the core and the latter may then readily be drawn from the end of the wire or cable without wasting the cable.

Obviously as one end of the clamp will be secured in any suitable manner to an insulator and some stationary object, any pull of the clamped wire that is directed on the core, will tend to tighten the clamp.

Having described my invention, I claim,—

1. A dead end clamp for cables comprising an outer sleeve having a tapered longitudinal passage therethrough and provided with means adjacent to the larger end of said passage for attaching it to a stationary object, of a tapered core having a wedge fit in the longitudinal passage of the sleeve and said core also having a central passage through which the end of the cable extends, the outer end of the core being reduced in diameter around its exterior and the ends of the cable-strands being bent back over the end of the core and laid around the reduced end of the latter.

2. A dead end clamp for wires or cables comprising an outer sleeve having a tapered passage therethrough, an exteriorly-tapered core to enter and wedge in the sleeve-passage said core also having a central passage to receive the wire end it is to engage,—the outer end of the core being reduced in diameter and the inner end of said core having longitudinal slots extending through the inner end and toward the reduced end.

3. A dead end clamp for wires or cables comprising an outer sleeve having a tapered passage therethrough, an exteriorly-tapered core to enter and wedge in the sleeve-passage said core also having a central passage to receive the wire end it is to engage,—the outer end of the core being reduced in diameter to provide a reduced neck at said end with a shoulder at the inner end of said neck and the body of the core having a longitudinal slot crossing the shoulder and extending through the neck to the outer end and also having another longitudinal slot which crosses the shoulder and extends through the body to the inner end of the latter.

In testimony whereof I affix my signature.

LUTHER B. MYERS.